United States Patent [19]

Atkin

[11] Patent Number: 4,698,155
[45] Date of Patent: Oct. 6, 1987

[54] METHOD OF AND APPARATUS FOR CONTINUOUS METERED REMOVAL OR ADDITION OF SMALL QUANTITIES OF FLUID

[75] Inventor: John Atkin, Corona del Mar, Calif.

[73] Assignee: Akzo NV, Arnhem, Netherlands

[21] Appl. No.: 750,012

[22] Filed: Jun. 27, 1985

[30] Foreign Application Priority Data

Jun. 28, 1984 [DE] Fed. Rep. of Germany ....... 3423737

[51] Int. Cl.⁴ .............................................. B01D 13/00
[52] U.S. Cl. ............................. 210/321.6; 210/323.2; 210/433.2; 210/500.23; 210/927
[58] Field of Search ..................... 210/323.2, 651, 336, 210/927, 321.1, 433.2, 416.1, 500.23

[56] References Cited

U.S. PATENT DOCUMENTS

3,228,877 1/1966 Mahon ................................ 210/651
4,267,053 5/1981 Hashino et al. .............. 210/323.2 X
4,306,973 12/1981 Ishikawa ............................ 210/336

*Primary Examiner*—Frank Spear
*Attorney, Agent, or Firm*—Michael J. Striker

[57] ABSTRACT

A very small uniform fluid stream is produced and kept constant over a prolonged period by using at least one fluid-permeable membrane which can be composed of hollow filaments, and the method and apparatus can be used, for example in cardiac catheterization and blood pressure measurement in the blood.

10 Claims, 9 Drawing Figures

METHOD OF AND APPARATUS FOR CONTINUOUS METERED REMOVAL OR ADDITION OF SMALL QUANTITIES OF FLUID

BACKGROUND OF THE INVENTION

The present invention relates to a method of and an apparatus for continuous metered removal of addition of small quantities of fluid over a prolonged period by producing and maintaining small uniform fluid streams.

For producing small uniform streams, a wide variety of devices were used depending on the different requirements such as capillaries or in another words very fine tubes made of glass or metal, individual bores in plates with sometimes sharp edges, cylinders provided with a notch along one surface line and arranged in a tube leaving only one passage formed by the notch and the like.

The production of such devices is technically expensive. Moreover, in such devices there is the danger that the extremely fine flow passages are blocked completely or partially by minute particles and the fluid stream is thereby completely or partially interrupted. Methods in which a fluid flows through a membrane are also known, for example reverse osmosis or dialysis. Porous membranes have been used in the past, for example for filtration, or for ultrafiltration or for separating a liquid component from a liquid, for example for separating (recovery) blood plasma from whole blood, for the oxygenation of blood, for separation of gas, for transmembrane distillation or other separation processes.

The object of all these known methods with the use of membranes is to obtain maximum fluid streams through the membranes, so called through flow rates. In the course of these methods a gradual reduction in the transmembrane fluid streams generally takes place, and the membrane consequently must be regenerated, cleaned by flushing (back) or replaced for reproducing the desired original high transmembrane fluid stream.

SUMMARY OF THE INVENTION

Accordingly, it is an object of the present invention to provide a method of and an arrangement for producing a small uniform fluid stream, and if desired, maintaining the same for a prolonged period, using simple means, or in other words with considerable lower production costs, and which permit continuous removal or addition of small quantities of fluid over a prolonged period from or to a fluid reservoir or a fluid stream.

In keeping with these objects and with others which will become apparent hereinafter, one feature of the present invention resides, briefly stated, in a method in accordance with which a membrane which is permeable to a fluid is used and the fluid is passed through the membrane to produce and maintain a very small uniform fluid stream for continuous metered removal of addition of small quantities of fluid over a prolonged period for production and maintenance of small uniform fluid streams.

The method in accordance with the present invention is equally suitable for liquids, vaporous or gaseous fluids, and its advantages are particularly useful in the medical field. In this field, in fact, it is suitable for example for cardiac catheterization, for measurement of blood pressure, for slow controlled addition of drugs, for continuous infusion of insulin, for removal of spinal marrow, for wound exudate or cerebral fluid, in similar methods conventional in medicine in which addition or removal of minute quantities of liquid takes place over periods amounting, for example two hours. A catheter device for cardiac catheterization in which a small liquid stream for passing through the microcatheter is produced by a capillary is known for example from German Offenlegungschrift No. 1,566,115.

In the industrial field the method in accordance with the present invention is advantageously used for example for continuous removal of a small quantity of gas from a gas stream or reservoir, for monitoring the composition of the gas by massspectroscopy or gas chromatography, for example in the case of discharged air, waste gases or smoke gases, or for continuous removal of small quantities of liquid from a stream or reservoir for analysis of the respective liquid, for example when monitoring effluent or during monitoring and control of chemical processes.

The term "very small fluid streams" in the context of the present invention refers to fluid streams in the range of 1 ml/day to 100 ml/h. The respective desired quantity of fluid can be adjusted by suitable selection and dimensioning of the membrane and application of a suitable pressure difference to the membrane. The so-called "ultrafiltration rate" (UFR) which indicates the transmembrane diffusion through a membrane for water, measured in milliliters per square meter of membrane area per hour and per pressure unit measured in millimeters of mercury column ($ml/m^2 \cdot h \cdot mm\ Hg$), is usually given as a gauge of the pressure-dependent transmembrane diffusion.

Membranes having an ultrafiltration rate lying in the range of 2 to 500 $ml/m^2 \cdot h \cdot mm\ Hg$ and, more specifically, those in the range from 15 to 100 $ml/m^2 \cdot h \cdot mm\ Hg$ are particularly suitable for the method according to the invention. A method of determining this parameter which is typical to membranes is described below.

There are a wide variety of suitable membranes available as flat sheets, tubular sheets, pipes, thin tubes or hollow fibers (also known as hollow filaments or capillaries). The membrane most suitable for the individual application can easily be selected, if necessary after carrying out simple tests.

Membranes consisting of celllose regenerated from cellulose cuprammonium solution, of cellulose acetate, of completely or partially saponified cellulose acetate, of nylon or polypropylene have proven particularly suitable for carrying out the method according to the invention.

The method according to the invention can be carried out with advantage, in particular, in the medical field using membranes which have pores with a maximum pore size of 0.2 $\mu$m, as these membranes permit sterile filtration of the diffusing fluid at the same time. It is also possible, however, to carry out such sterile filtration or a different conventional (pre-) filtration and/or when carrying out the method according to the invention with a liquid, the separation of gas bubbles contained in the liquid before producing and maintaining the very small uniform fluid stream according to the invention.

Another advantage of the method according to the invention resides in the fact that a foreign particle accidentally included in the fluid does not significantly impair the desired fluid stream through the membrane as the membrane area available for the diffusion of the fluid is a multiple of the size of the particle in each case and the particle can at most block only an insignificant part of this area for diffusion. On the other hand, with the capilliary tubes known in the prior art, a single foreign particle could lead to blockage of the fine flow passage or at least to a significant reduction thereof and could therefore significantly impair diffusion.

The method according to the invention is preferably carried out with at least one membrane of hollow filament shape, as this enables the necessary membrane area to be accommodated in a minimum of space. Even when using only one hollow filament, the risk of blockage is comparatively low as hollow filaments which are even suitable for the smallest fluid streams can have a considerably larger diameter than the formerly conventional capillaries etc. since the means governing the fluid stream is the wall of the hollow filament and its pores, and the area of the hollow filament wall is in turn greater than the lumen cross section of the hollow filaments. Apparatus suitable for carrying out the method according to the invention can be produced much more cheaply when using hollow filaments than the devices formerly used for this purpose and mentioned above by way of example. When carrying out the method according to the invention with several hollow filaments, there is also a much smaller risk of blockage, if it exists at all, as blockage of several hollow filaments can be prevented by careful preparation and implementation of the method. A variation in the fluid stream of the order of 5% can generally be allowed for. For this reason, a maximum number of hollow filaments of 20 has proven extremely acceptable as the transmembrane fluid stream would merely be reduced by 5% even if a hollow filament were completely blocked, this being an extremely rare event.

Moreover, the membrane area attainable with 20 hollow filaments is small enough for most applications of the method according to the invention to enable the desired very small fluid stream to be reliably adjusted. The membrane area diffused by the fluid can also be controlled by appropriate diminsioning of the length and/or the diameter of the hollow filaments and can be calculated in a very simple manner. If a reduction in the fluid stream to a possible blockage of up to 10% is allowed for the method according to the invention can also be carried out with only 10 hollow filament for the reasons given above.

When using a large number of hollow filaments, the advantage also arises that, in the case of a hollow filament bundle having an excessively large transmembrane diffusion, the diffusion can be reduced to the predetermined value in a simple manner by closing one or more hollow filaments.

Hollow filaments can also be produced with comparatively low production costs in optional lengths of extremely constant quality and with reproducible properties and can be processed into hollow filament bundles which, in turn, can be processed into units suitable for the method according to the invention.

The pressure difference which can be adjusted at the membrane and is suitable for carrying out the method is not only based on the desired quantity of fluid but, for example, can also depend on the properties of the membrane, for example if a certain minimum pressure specific to the membrane has to be exceeded for producing a transmembrane fluid stream. However, other criteria for the pressure difference to be applied can also play a part, for example during cardiac catheterization or blood pressure measurement when the pressure to be applied are based on the respective blood pressure. A pressure difference conventional for this purpose lies in the range of 200 to 300 mm Hg, for example.

The method according to the invention can also be carried out, however, with a minimal pressure difference such as 2 or 3 mm Hg. It is also possible to achieve the necessary pressure difference by producing a vacuum on the other side of the membrane. The adjustment, maintenance and monitoring of even very low pressure differences at the membrane do not pose technical or measurement problems in themselves and can be effected with the known means and measures conventional for this purpose. Their practical application is based merely on the production costs allowable in each particular case. The fluid can preferably be supplied to the membrane from a supply vessel via a rigid or flexible tube, that is to say a pipe or a hose. To produce the pressure necessary for achieving the desired fluid stream immediately in front of the membrane, the supply vessel can be arranged at a suitable height above the membrane, in which case the supply vessel must be open or provided with a ventilation means which should possibly permit only the admission of sterile filtered air, particularly in medical applications. However, a sealed container in which an appropriate pressure has been adjusted, for example by means of a gas pressure cushion, in front of the membrane for producing the necessary pressure can be used as supply vessel.

When adopting the method according to the investion, it may be necessary, as in the formerly conventional methods of this type, to charge some part of the fluid-supplying pipe with a temporary surge of fluid upstream or downstream of the membrane. Thus, for example, it is necessary in cardiac catheterization or blood pressure measurement to flush the measuring catheter introduced into the patient's heart or artery from time to time as it may become partially blocked by clots despite the continuous diffusion of the measuring catheter with, for example, physiological common salt solution, causing the blood pressure measurement to be in error. Or, after removing blood through such a catheter, it is necessary to clear the catheter again before blood pressure measurement and monitoring of cardiac activity can be effected again without interruption. The short, comparatively vigorous flushing stream required for these similar cases mentioned by way of example is preferably achieved by temporarily by-passing the membrane. A plurality of specific devices suitable for this purpose is known and can be used in the method according to the invention. A substantially simpler device which permits the membrane to be by-passed in a substantially simpler manner is described below.

Depending on the application, it may also be advantageous to flush the membrane free of any deposits by temporary cross-flows as is normal in cross-flow filtration and separately to collect or divert the resultant flushing liquid containing any deposits and to reject it.

The apparatus suitable for carrying out the method according to the invention consists of a housing with a fluid inlet opening and fluid outlet opening and a fluid-permeable membrane which is arranged in fluid-tight manner in the housing and divides the internal space enclosed by the housing into a first chamber and a second chamber, the fluid inlet opening joining the first chamber and the fluid outlet opening joining the second chamber.

The fluid-permeable membrane is preferably formed by at least one hollow filament whose open end is in the first chamber and which penetrates into the second chamber and whose other end is sealed.

The membrane can also be formed by at least one hollow filament whose two open ends are in the first chamber and whose U-shaped portion penetrates into the second chamber.

The open ends are preferably embedded in a sealing composition so that the bedding of the hollow filament together with the hollow filament walls form the partition wall between the first and the second chamber, the bedding being connected in fluid-tight manner to the housing so that the fluid can only pass through the wall of the hollow filaments into the second chamber.

With substantially straight hollow filaments, the hollow filament ends penetrating into the second chamber can also be locked by sealing them completely in a sealing block.

The possibility of arranging membrane units of differing membrane area in housings of uniform dimensions and thus avoiding the need for a large number of types, is afforded in that the hollow filaments are embedded to differing lengths depending on the respective requirements and are thus sealed in fluid-tight manner and the fluid-permeable membrane area can thus also be dimensioned to different sizes.

When using several hollow filaments, the desired ultrafiltration rate is also adjusted by completely closing the open end merging into the first chamber of one or more hollow filaments until the desired value is achieved.

To produce a short liquid surge by by-passing the membrane, as described above, the open hollow filament ends are preferably embedded in a flexible hose. In fact, this arrangement allows a diffusion of fluid to be produced between bedding mass and hose by one-ended shaping of the hose in the region of the bedding and allows the hose to be retracted again at any time.

If the apparatus according to the invention is proposed for use in the medical field, all parts of the apparatus must be designed to meet the prevailing regulation in particular the individual parts must be produced from the conventional blood-compatible materials. Polyurethane has proven particularly suitable as a bedding mass for hollow filaments.

With hollow filament bundles, a value for the diameter of the hollow filament bundle amounting to about one third of the bundle length has proven very serviceable. The length of the hollow filaments should be at least 20 mm to simplify processing, but the fluid-permeable length to the hollow filaments can be considerably smaller. Thus, with a hollow filament length of, for example, 30 mm, the bedding length can be 20 mm so that the free, that is fluid-permeable, effective length is 5 mm.

Small uniform fluid streams can also be produced according to the invention by connecting several apparatus according to the invention in parallel and by combining the single, individually produced fluid streams.

It is also possible according to the invention to combine the fluid stream produced according to the invention with a larger fluid stream produced in a different manner so as to obtain a very precisely metered larger fluid stream in this way.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
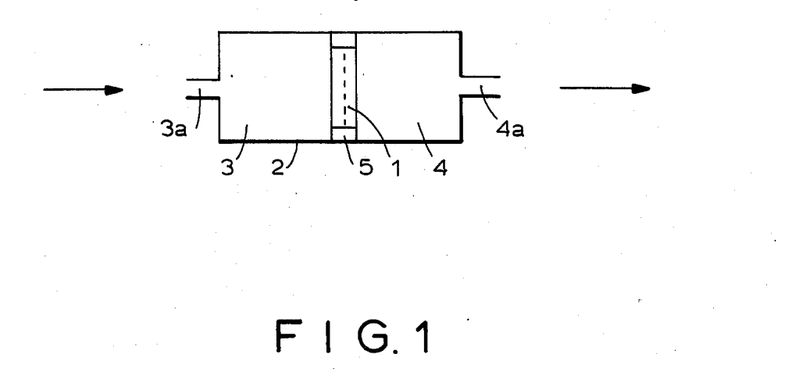
FIG. 1 is a view showing an apparatus in accordance with the present invention, with a flat membrane.

An apparatus in accordance with the present invention shown in FIG. 1 has a membrane 1 which is clamped in a tubular housing 2 and divides an interior space surrounded by the housing 2 into a first chamber 3 and a second chamber 4. The direction of diffusion is shown by the arrows. In the first chamber 3 upstream of the membrane 1 a higher pressure can be adjusted than in the second chamber 4 downstream of the membrane 1. Thereby a flow of a fuid is caused from the first chamber 3 through the membrane 1 into the second chamber 4. By adjusting of a respective pressure difference between the first chamber 3 and the second chamber 4, the quantity of fluid desired per unit time can be conveyed through the membrane 1 and can be metered uniformly. The fluid is supplied to the first chamber 3 through a supply opening 3a and discharged from the second chamber 4 through a discharge opening 4a.

Figure 2:
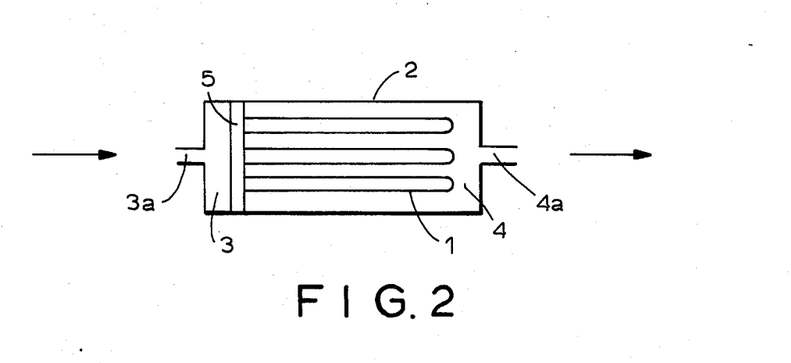
FIG. 2 is a view showing the inventive apparatus in accordance with another embodiment with U-shaped hollow filaments.

In the apparatus shown in FIG. 2, the membrane 1 is composed of several U-shaped hollow filaments 1 which are embedded with their open ends in a sealing block 5 which is connected in fluid tight manner with a casing of the housing 2. The mode of operation of this apparatus is the same as the apparatus illustrated in FIG. 1 and described hereinabove. With using of hollow filaments, however, it is possible to provide the necessary membrane area in a housing with a smaller flow cross-section and overall smaller dimensions and, with equal membrane thickness, to use higher pressure differences than with a flat membrane. Since both ends of each hollow filament 1 of the U-shaped hollow filaments, are open in the first chamber 3, diffusion is only possible here through the wall of the hollow filaments 1 acting as a membrane.

Figure 3:
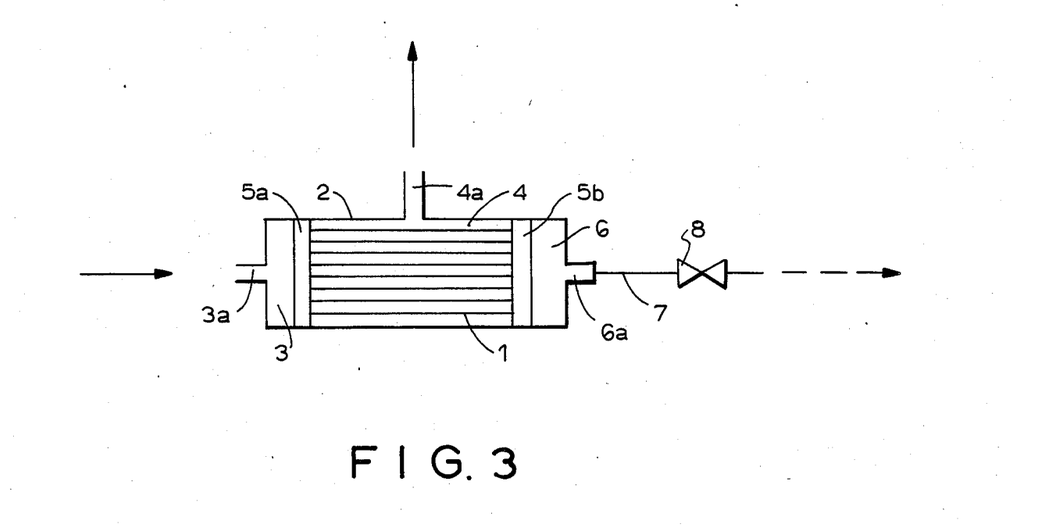
FIG. 3 is a view showing the inventive apparatus in accordance with yet another embodiment, with straight hollow filaments.

In the apparatus shown in FIG. 3, the membrane 1 is formed by several substantially straight hollow filaments which are embedded with their one open end in a sealing block 5a and open into the first chamber 3. They are also embedded with their other end in a sealing block 5b and open into a third chamber 6. The third chamber 6 is connected via a fluid pipe 7 with a blocking member 8. The sealing blocks 5a and 5b are connected in fluid-tight manner with a casing of the housing 2. The path of flow is identified by the solid arrows. In a particular use of the apparatus, the fluid flows from the first chamber 3 into the hollow filaments of the membrane 1, i.e., in the lumen thereof, and passes through the wall of the hollow filaments of the membrane 1 into the second chamber 4, and leaves the apparatus through the discharge opening 4a in the housing. A fluid pipe which is not shown in the drawing is usually connected to the discharge opening 4a. For flushing away deposits which can form at the inner side of the walls of the hollow filaments, the blocking member 8 can be opened temporarily. The direction of flow produced in this case is identified with the broken arrow.

Figures 4, 7, 8:
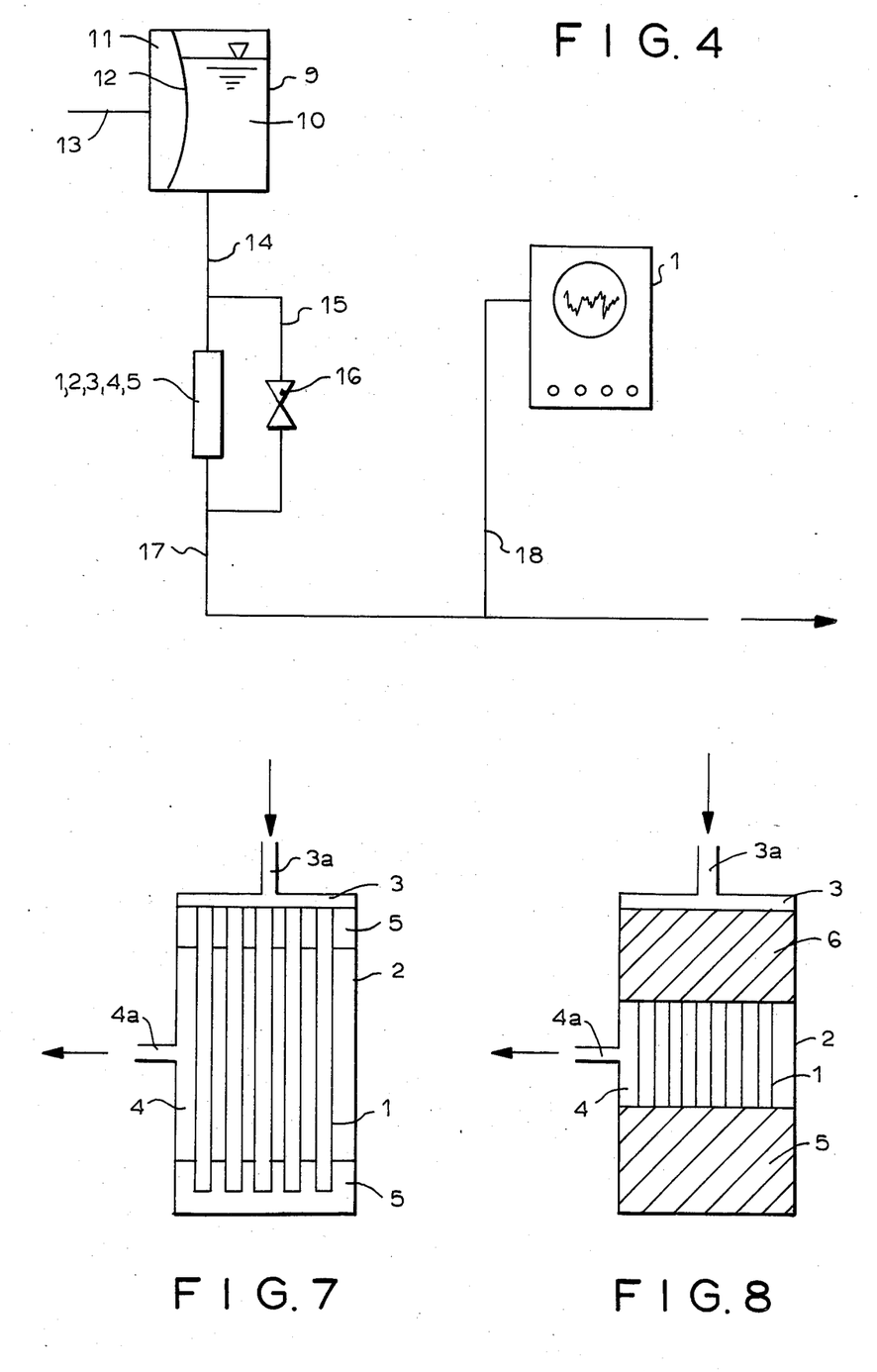
FIG. 4 is a view showing a device for carrying out a method in accordance with the present invention, using the inventive apparatus.
FIGS. 7 and 8 are used showing further embodiments of the apparatus in accordance with the present invention.

FIG. 4 shows an apparatus for blood pressure measurement of cardiac catheterization using the method in accordance with the present invention. A liquid, for example, physiological common salt solution, is accommodated in a closed chamber 10 of a container 9. The chamber 10 is separated from a pressure chamber 11 of the container 9 by a flexible gas-impermeable and liquid-impermeable membrane 12.

The pressure chamber 11 is connected via a fluid pipe 13 with a pressure-producing device which is not shown. By adjusting an excess pressure in the pressure chamber 11, a corresponding excess pressure is also generated in the liquid chamber 10. The desired flow of liquid can thereby be controlled by the pressure in the pressure chamber 11 of the container 9. A fluid pipe 14 leads from the liquid chamber 10 of the container 9 to an actual metering device 1, 2, 3, 4, 5 which corresponds to the devices shown in FIGS. 1, 2 or 4 and 5. From this metering device, a fluid pipe 17 leads to a measuring catheter, an injection needle or the like which is not shown. A pressure measuring instrument 19, for example a monitor with an oscillograph is connected with a fluid pipe 17 via a fluid pipe 18. A patient's blood pressure, for example, can be measured with the pressure measuring instrument 19 while a small liquid stream is continuously conveyed from the liquid chamber 10 of the liquid container 9 via the fluid pipe 14, the metering device 1, 2, 3, 4, 5, the fluid pipe 17 and a cannula (not shown) leading into the patient's body to the patient's blood stream.

If the extremely fine liquid duct which opens into the patient's blood vessel is partially or completely blocked and therefore affects the measurement of blood pressure, a considerably greater liquid flow can be caused to flow through the liquid pipe 15 past the metering device into the fluid pipe 17 by actuating the blocking members 16, and the blockage can thus be eliminated by flushing out the particles causing the blockage, generally clots. The connecting lines 14, 15, 17 and 18 can be made rigid such as pipes, or flexible such as hoses. The blocking member 16 and the by-pass pipe 15 is not subject to any restriction with respect to its size and mode of operation, as long as it allows a sufficiently large liquid passage for flushing away blockages or for other operating requirements. Other devices which are best suited to the requirements, simple to operate and reliable, such as stop-taps, valves and the like, are known per se and widely available to a skilled man, therefore there is no need to give here details of their particular embodiments.

Figure 5:
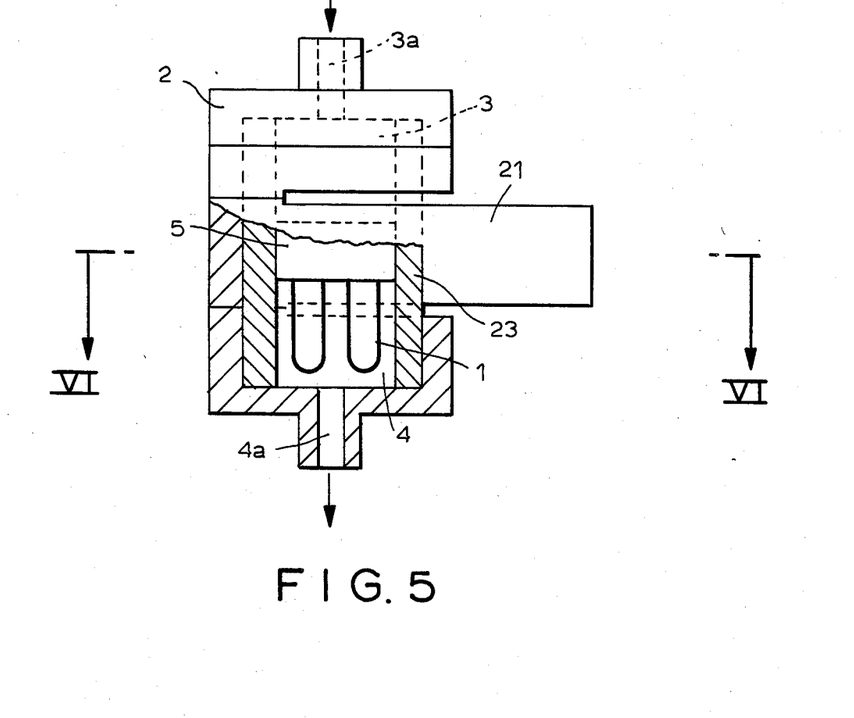
FIGS. 5 and 6 are used showing a particularly preferred embodiment of the apparatus in accordance with the present invention.
Figure 6:
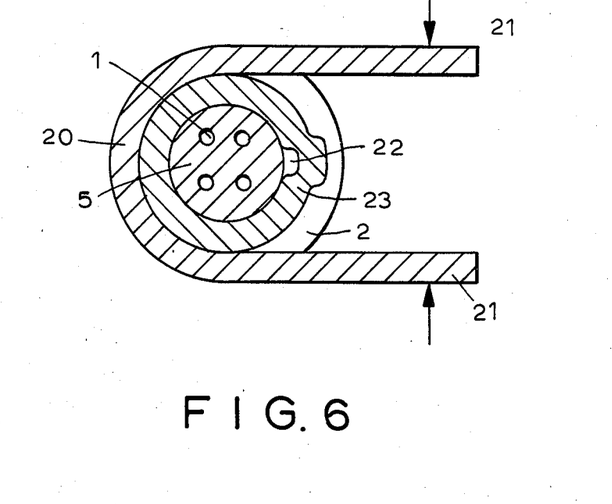

FIGS. 5 and 6 show an apparatus in accordance with the present invention in which the membrane 1 can be by-passed in a particularly simple manner. The sealing block 5 which holds the membrane 1 and can be, for example, circular when using a flat membrane, is fitted in fluid-tight manner in a flexible elastic casing 23 of the housing 2, but is not rigidly connected with it. A U-shaped clip 20 is arranged around the casing 23 in the region of the sealing block 5 and rigidly connected, in part, with the remaining portion of the housing 2. By pressing together free ends 21 of the clip 2 for example with the thumb and index finger in direction of the arrows, the casing 23 is deformed in such a way that a gap 22 is formed between the casing 23 and the sealing block 5 through which a substantially larger quantity of fluid can pass than through the membrane 1 formed by the hollow filaments. By releasing or unloading the both free ends 21 of the clip 20 which is composed of a resilient material, the casing 23 assumes its original shape again, so that the gap 22 again disappears. It generally suffices to produce the casing 23 from a flexible elastic material, for example from silicone polyurethane, only in the region of the sealing block 5 which holds the membrane 1.

FIGS. 7 and 8 show a simple way to obtain hollow filament units, which, despite equal external dimensions (diameter and length) can be designed for various fluid flows. The advantage here is in the fact that for such units which differ in their diffusion rate because of their external dimensions, uniform housing 2 or in another words housings with the same dimensions can be used. Therefore, an excessively large number of different types of units can be avoided. As can be seen from FIGS. 7 and 8, this is achieved by embedding the hollow filaments of the membrane 1 with different lengths, so that the free lengths of the hollow filaments which is available for the diffusion of fluid can be differently long. The material costs for the larger sealing blocks 5 shown in FIG. 8 which can be insignificantly higher in this method are generally substantially smaller than the production costs needed for a larger number of different types. The remaining parts of the apparatus in accordance with the embodiments shown in FIGS. 7 and 8 have the same reference numerals as in the embodiments shown in FIGS. 1–6.

The ultrafiltration rate can be determined in accordance with the example given hereinbelow.

Figure 9:
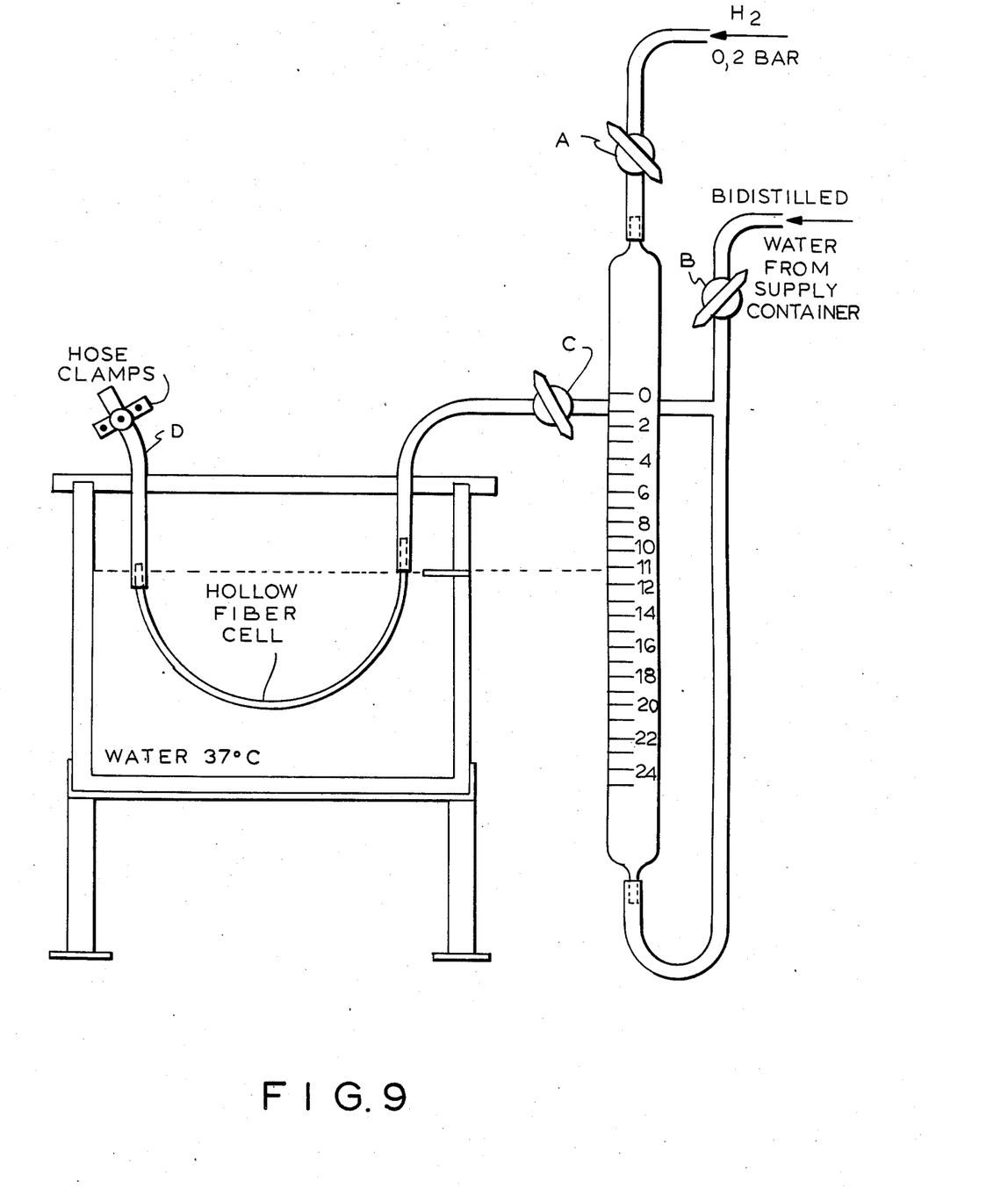
FIG. 9 is a view showing a measuring device for determining ultrafiltration rates of hollow fibers (hollow filaments).

The following parts are required for determining the ultrafiltration rate, as shown in FIG. 9:

--- an acrylic glass tank with external dimensions - length 1000 mm,
width 250 mm,
height 200 mm,
wall thickness 10 mm;
a thermostat;
a measuring pipette with 0.1 ml divisions;
a 5 liter water container;
a reducing valve (standard type for nitrogen bottles);
a reducing valve, self-bleeding, 0 to 1.4 bar;
a precision measurement manometer, 0 to 1 bar;
take-up devices (bridges) made of acrylic glass for taking up the connections to the hollow fibre cell to be investigated;
glass tubes;
hoses;
taps;
T pieces;
hose points;
hose clamps;
stands.

---

The arrangement of the individual parts is shown in FIG. 9. The tank is filled to about ¾ with completely desalinated water which is maintained at a temperature of about 37° by the thermostat. The 5 liter water container is filled with bi-distilled water and is used for filling the measuring pipette. The pressure in the system is adjusted to 0.2 bar (150 mm Hg). Before measurement is commenced, a check is carried out to ascertain that sufficient bi-distilled water is present in the supply contained, whether the pressure in the system is adjusted constantly to 0.2 bar (150 mm Hg), and whether the completely desalinated water poured in the tank has a temperature of 37° C. At the start of measurement the meniscus in the pipette must be at the same level as the water level of the water bath in the tank.

The method of measurement can be summarised briefly as follows: bi-distilled water at a pressure of 1.2 bar (150 mm Hg) is pressed through the hollow fibre bundle to be investigated, which is located in a water bath at a constant water temperature of 37° C. during measurement, and the difussed volume of liquid is measured in a pipette connected upstream.

In particular, measurement is performed as follows: one end of the hollow fibre cell is firstly pushed into the hose end of the hose connected to the tap C. The other end of the hollow fibre cell is held at the top. The tap C is then opened so that the air contained in the hollow fibres is displaced by the entering water. As soon as water issues from the open end of the hollow fibre cell, it is introduced into the hose end of the hose leading to hose clamp D and the hollow fibre cell is immersed in the temperature-controlled water. Any air still present in the hose leading to the hose clamp D can be discharged via the hose clamp D.

With hollow fibres consisting of cellulose regenerated from a cellulose cuprammonium solution, a swelling time of 15 minutes must be observed before the start of actual measurement. For this purpose, the measuring pipette is filled with bi-distilled water approximately up to 9 ml mark via the tap D when tap A is opened.

After adjusting the meniscus to the 11 ml mark, measurement can be started. 30 minutes after beginning, the meniscus level is read and the difference in the meniscus level in the pipette corresponds to the volume of water diffused through the hollow fibres within 30 minues. After the first measurement has been taken, a second measurement is immediately taken in the manner described above with the same meniscus level as at the beginning of the first measurement. The results of the two measurements are averaged arithmetically.

Measurement can be carried out on several hollow fibres cells simultaneously using the same tank, each hollow fibre cell being provided with its own measuring pipette.

To calculate the ultrafiltration rate fron the volume of water diffused through the total area of the hollow fibres used in 30 minutes at 0.2 bar (150 mm Hg), the effective area is firstly calculated from the internal surfaces of all hollow fibres (internal diameter of hollow fibres (m)×effective length of the hollow fibres (m)×π× number of hollow fibres).

Example of a measurement:

| | |
|---|---|
| Volume of diffused water | 4.2 ml; |
| Time | 0.5 hours; |
| Pressure | 150 mm Hg (0.2 bar); |
| Total effective area of all hollow fibres | 0.0205 m². |

The resultant ultrafiltration rate is:

$$\frac{4.2}{0.5 \cdot 150 \cdot 0.0205} = 2.73 \text{ ml/h} \cdot \text{m}^2 \cdot \text{Hg}$$

To determine the ultrafiltration rate, a hollow fibre bundle can be produced from any number of hollow fibres of any equal length (hollow filaments) whose ends are cast in to a sealing mass, the hollow fibre ends being exposed once the sealing mass has hardened to permit the admission of fluid into the hollow fibres. The sealing blocks should be dimensioned so as to allow a fluid-tight firm fit in the hoses of the measuring arrangement, as described above. For the sake of simplicity, certain parameters can be determined for all hollow fibre bundles such as the hollow fibre length the number of hollow fibres or the total area for the passage of fluid.

The ultrafiltration rate for flat sheet membranes can be determined in a similar manner, and appropriate samples can be clamped or cast in round or square form in a device especially designed for such measurements, for example based on the apparatus shown in FIG. 1. A known apparatus suitable for this purpose is, for example, the Millipore-Filter No. YY 30.090.00. To take measurements even at higher pressures, it may be necessary to support the membrane with a supporting plate which allows unobstructed passage of fluid.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letter Patent is set forth in the appended claims.

I claim:

1. An apparatus for continuous meter removal or addition of small quantities of fluid over a prolonged period, comprising a fluid permeable membrane arranged so that the fluid passes through said membrane and therefore at least one very small uniform fluid stream is produced and maintained; a housing which limits an internal space, said fluid permeable membrane being arranged so as to subdivide said internal space of said housing into a first chamber and a second chamber for passing the fluid from said first chamber through said fluid permeable membrane into said second chamber, said housing having a casing provided with a flexible and elastic portion; a sealing block which holds said membrane and arranged in said flexible and elastic portion in a fluid-tight manner but not rigidly connected thereto; and means for partially surrounding said flexible and elastic portion and deforming the same.

2. An apparatus as defined in claim 1, wherein said membrane has an ultrafiltration rate lying in the range from 2 to 500 ml/m²·h·mm Hg for water.

3. An apparatus as defined in claim 1, wherein said membrane has an ultrafiltration rate lying in the range from 15 to 100 ml/m²·h·mm Hg for water.

4. An apparatus as defined in claim 1, wherein said membrane is composed of a hollow filament having ends, said ends of said hollow filament being embedded in said sealing block.

5. An apparatus as defined in claim 1, wherein said membrane is composed of a plurality of hollow filaments having ends, said ends of said hollow filaments being embedded in said sealing block.

6. An apparatus as defined in claim 5, wherein said membrane is composed of at most twenty hollow filaments.

7. An apparatus as defined in claim 1, wherein said membrane is composed of cellulose regenerated from a cellulose cuprammonium solution.

8. An apparatus as defined in claim 1, wherein said membrane is composed of cellulose acetate.

9. An apparatus as defined in claim 1, wherein said membrane has pores with a maximum pore sizes of 0.2 μm.

10. An apparatus as defined in claim 1, wherein said surrounding and deforming means includes a U-shaped clip which partially surrounds said flexible and elastic portion and is rigidly connected at least in part to the remaining portion of said housing.

* * * * *